(12) United States Patent
Maxted

(10) Patent No.: US 8,612,541 B2
(45) Date of Patent: *Dec. 17, 2013

(54) METHOD AND APPARATUS FOR MULTI-TENANT POLICY MANAGEMENT IN A NETWORK DEVICE

(75) Inventor: Mark Maxted, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 13/098,268

(22) Filed: Apr. 29, 2011

(65) Prior Publication Data

US 2012/0278425 A1  Nov. 1, 2012

(51) Int. Cl.
*G06F 15/16* (2006.01)

(52) U.S. Cl.
USPC ........... 709/217; 709/223; 709/225; 709/227; 726/1

(58) Field of Classification Search
USPC .................. 709/217, 223, 225, 227; 726/1
See application file for complete search history.

(56) References Cited

U.S. PATENT DOCUMENTS

| | | | |
|---|---|---|---|
| 5,751,967 A | 5/1998 | Raab et al. | |
| 5,918,017 A | 6/1999 | Attanasio et al. | |
| 6,097,882 A | 8/2000 | Mogul | |
| 6,219,706 B1* | 4/2001 | Fan et al. | 709/225 |
| 6,256,741 B1* | 7/2001 | Stubblebine | 726/10 |
| 6,347,376 B1 | 2/2002 | Attwood | |
| 6,381,639 B1 | 4/2002 | Thebaut et al. | |
| 6,466,984 B1 | 10/2002 | Naveh et al. | |
| 6,496,866 B2* | 12/2002 | Attanasio et al. | 709/239 |
| 6,539,425 B1 | 3/2003 | Stevens et al. | |
| 6,728,748 B1 | 4/2004 | Mangipudi et al. | |
| 6,763,370 B1 | 7/2004 | Schmeidler et al. | |
| 6,804,722 B1 | 10/2004 | Nishi | |
| 7,124,188 B2 | 10/2006 | Mangipudi et al. | |
| 7,447,755 B1* | 11/2008 | Maxted et al. | 709/223 |
| 7,555,552 B2* | 6/2009 | Maxted et al. | 709/225 |
| 7,774,504 B2* | 8/2010 | Chene et al. | 709/246 |
| 8,041,022 B1* | 10/2011 | Andreasen et al. | 379/221.1 |

(Continued)

OTHER PUBLICATIONS

Heiler et al., Policy Driven Configuration Management of Network Device, Network Operations and Management Symposium, 1996, IEEE, vol. 3, Apr. 15-19, 1996, pp. 674-689.

(Continued)

*Primary Examiner* — Alina N Boutah
(74) *Attorney, Agent, or Firm* — Fahmi, Sellers, Embert & Davitz

(57) ABSTRACT

A communication between a client and an intermediary device on a network is evaluated at multiple communication flow checkpoints according to a tenant-specific policy current at the outset of the communication and selected according to an identification of a tenant with which the client is associated, the identified tenant being one of a plurality of tenants services by the intermediary device. Non-current policies are maintained by the intermediary device for use in connection with communications that have not yet been fully processed so that consistency of policy enforcement is maintained even if policies change while transactions are in process. Further, long-standing transactions may be reevaluated in light of changed policies to determine whether or not the transactions should be dropped.

11 Claims, 10 Drawing Sheets

(56) References Cited

U.S. PATENT DOCUMENTS

| | | | |
|---|---|---|---|
| 2004/0111461 A1* | 6/2004 | Claudatos et al. | 709/200 |
| 2005/0005165 A1* | 1/2005 | Morgan et al. | 713/201 |
| 2005/0273849 A1* | 12/2005 | Araujo et al. | 726/12 |
| 2006/0253599 A1 | 11/2006 | Monteiro et al. | |
| 2006/0259949 A1* | 11/2006 | Schaefer et al. | 726/1 |
| 2007/0226775 A1* | 9/2007 | Andreasen et al. | 726/1 |
| 2007/0294253 A1* | 12/2007 | Strub et al. | 707/9 |
| 2009/0165078 A1* | 6/2009 | Samudrala et al. | 726/1 |
| 2009/0178132 A1* | 7/2009 | Hudis et al. | 726/12 |
| 2009/0187651 A1* | 7/2009 | Schuckenbrock et al. | 709/224 |
| 2010/0100949 A1* | 4/2010 | Sonwane et al. | 726/7 |
| 2011/0153724 A1* | 6/2011 | Raja et al. | 709/203 |
| 2011/0179477 A1* | 7/2011 | Starnes et al. | 726/9 |
| 2011/0314161 A1* | 12/2011 | Andreasen et al. | 709/226 |
| 2012/0023544 A1* | 1/2012 | Li et al. | 726/1 |
| 2012/0060198 A1* | 3/2012 | Tremblay et al. | 726/1 |
| 2012/0124211 A1* | 5/2012 | Kampas et al. | 709/226 |
| 2012/0134264 A1* | 5/2012 | Ludwig et al. | 370/230 |
| 2012/0154125 A1* | 6/2012 | Canora et al. | 340/10.42 |
| 2012/0198512 A1* | 8/2012 | Zhou et al. | 726/1 |
| 2012/0233668 A1* | 9/2012 | Leafe et al. | 726/4 |
| 2013/0013738 A1* | 1/2013 | Astete et al. | 709/217 |
| 2013/0115986 A1 | 5/2013 | Schmidt et al. | |
| 2013/0167193 A1* | 6/2013 | Brookins et al. | 726/1 |

OTHER PUBLICATIONS

Moore et al., Policy Core Information Model-Version 1 Specification, <http://www.ietf.org/rfc/rfc3060.txt>, p. 1-94, The Internet Society, Feb. 2001.

Westerninen et al., Terminology for Policy-Based Management, <http://www.ietf.org/rfc/rfc3198>, p. 1-20, The Internet Society, Nov. 2001.

Rafalow et al., Policy Requirements for Edge Services, <http://search.ietf.org/internet-drafts/draft-rafalow-opes-policy-requirements-00.txt>, p. 1-14, The Internet Society, Jul. 2001.

Tomlinson et al., A Model for Open Pluggable Edge Services, <http://search.ietf.org/internet-drafts/draft-tomlinson-opes-model-01.txt>, p. 1-31, The Internet Society, Nov. 2001.

Snir et al., Policy QoS Information Model, <https://www.ietf.org/internet-drafts/draft-ietf-policy-qos-info-model-04.txt>, p. 1-66, The Internet Society, Nov. 2001.

\* cited by examiner

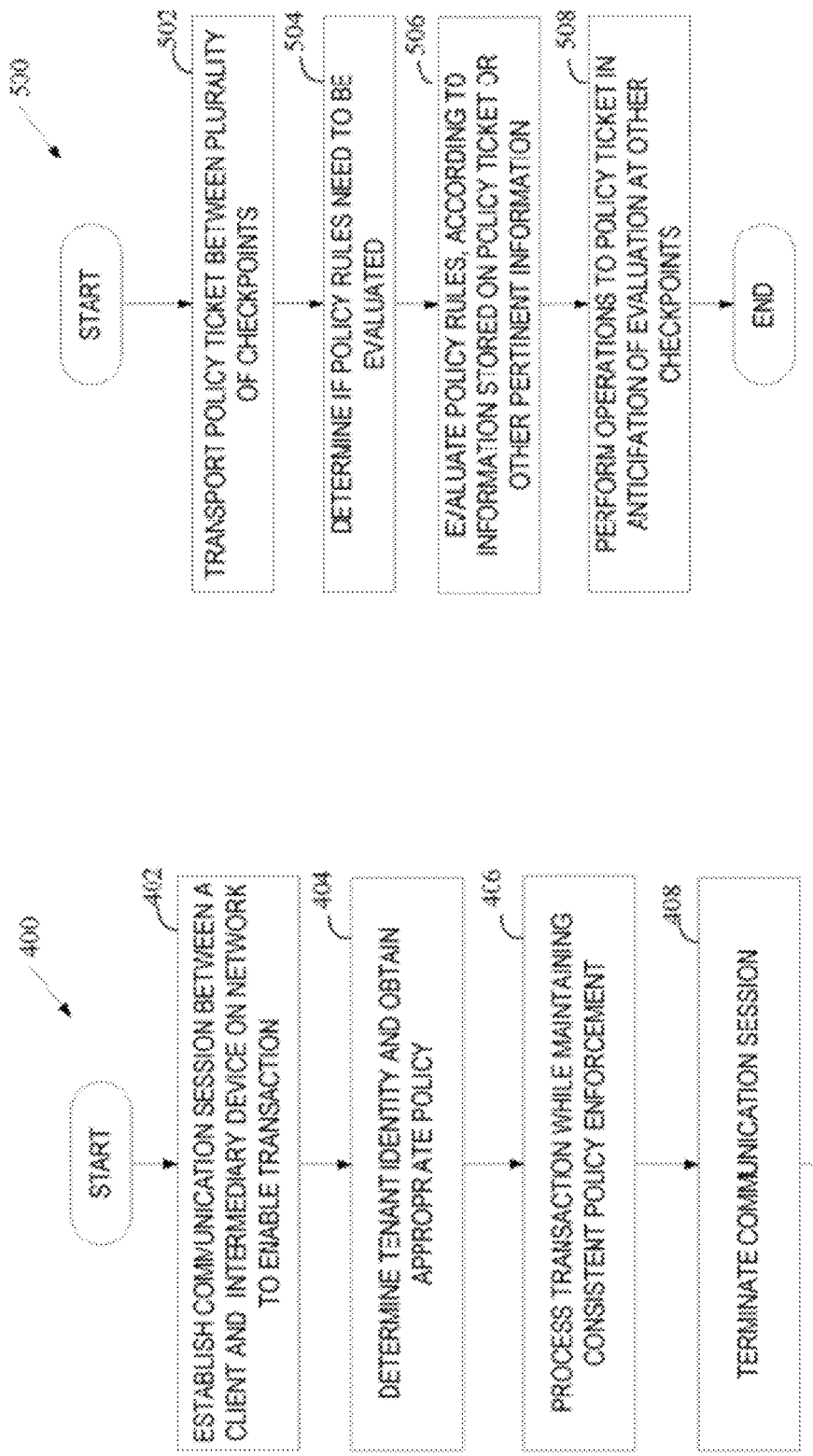

METHOD AND APPARATUS FOR MULTI-TENANT POLICY MANAGEMENT IN A NETWORK DEVICE

FIELD OF THE INVENTION

The present invention relates generally to network communications and, more specifically, to policy management and enforcement in a network device which services multiple customers or tenants.

BACKGROUND OF THE INVENTION

Typically, in a computer network, when a client requests content from a server, the request is sent to the server through a number of intermediary devices, each of which may alter the request in some way, according to rules installed on the intermediary device. Likewise, any response from the server may be subject to revision or processing in accordance with rules established by administrators for networks of which the requesting client is a member. The intent of these various rules, and their embodiment, are commonly known as policies.

Management of the typical request/response process is complicated even in the case of a single client or single network. For example, there are a number of hardware and software computing elements involved, each of which is affected by the policies, thus adding complexity to the management of the process. Further, information required for policy decisions arrives at different times. For example connection information, request information and response information form three discrete "bundles" of information that become available at different times and within different processing subsystems. Thus the typical process is difficult to manage from a timing standpoint. In addition, the typical process is often extended in time, during which the policy rules may change, thus increasing the possibility of conflicting policy versions. U.S. Pat. Nos. 7,447,755 and 7,555,552, both assigned to the assignee of the present invention, address solutions to these and other problems and describe mechanisms to allow for the uniform application of policy across separate processing elements within an intermediary device.

The problems highlighted above are even more complicated in the case of multi-tenancy contexts, where an intermediary device or group of devices configured to apply policies to inbound and outbound traffic of different networks are shared. For example, so-called cloud-based services are becoming popular among network administrators as a way to manage costs and ensure rapid deployment of updated solutions to their network clients. Accordingly, policy enforcement that used to occur at a network intermediary device located at the boundary of a single enterprise network may now be performed by a collection of such devices, still logically located at the boundary of a network, but which are also tasked with similar policy-based operations for many other networks that may or may not be co-owned by the owner of the enterprise network. The policies employed by administrators of the different networks may be different from one another and even in the case of a single network owner, different segments of a commonly owned network may require different policy applications.

SUMMARY OF THE INVENTION

In one embodiment of the invention, a network intermediary device includes means for selecting from among tenant-specific policies to be applied to a communication received at the intermediary device based on aspects of the communication that are available for inspection or derivable through policy evaluation of the communication. Further, means for retaining non-current versions of the tenant-specific policies may be provided so that the intermediary device may use same in connection with communications that have not yet been fully processed thereby ensuring consistency of policy enforcement even when policies change while transactions are in process. Further, long-standing transactions may be reevaluated in light of changed policies to determine whether or not the transactions should be dropped.

BRIEF DESCRIPTION OF THE DRAWINGS

The present invention is illustrated by way of example and not limited by the figures of the accompanying drawings in which like references indicate similar elements and in which:

FIG. 4 is a flow diagram of one embodiment of a method for managing policies within a network intermediary device during a communication.

FIG. 5 is an exemplary embodiment of a method of processing a communication while maintaining consistent policy rules enforcement

DETAILED DESCRIPTION

In light of the evolution to cloud-based services, the present inventor has recognized the need for and has developed updated solutions to the policy management applications described in the above-referenced U.S. Patents. Accordingly, described herein are methods and apparatus for multi-tenant policy management in a network device.

Definitions:

Herein, the terms "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), object(s) and/or information returned from the network device. Furthermore, the terms "communication" and "client communication" may be used interchangeably to mean the overall process of a client making a request and the network device responding to the request.

Figure 1:
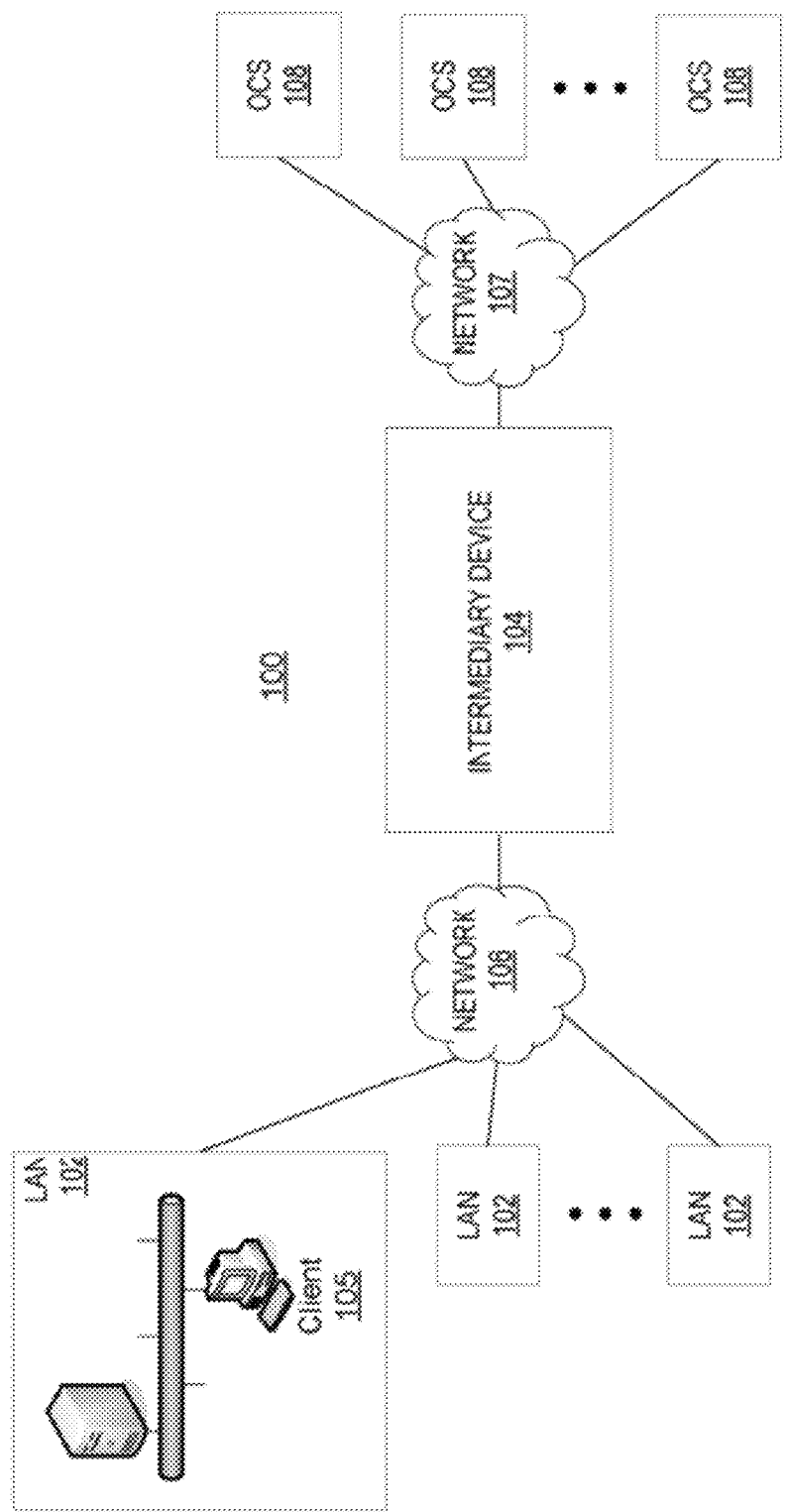
FIG. 1 is a block diagram of one embodiment of a network environment utilizing an intermediary device configured in accordance with an embodiment of the present invention.

Architecture:

FIG. 1 is a block diagram of one embodiment of a network environment 100 within which a network device, such as an intermediary device 104, may be used. The environment includes a plurality of networks or network segments (here referred to as LANs, although the network or segment need not be a local area network and may include multiple such networks or network segments) 102, each having one or more client devices 105, connected to an intermediary device 104 via a network 106. In some instances, network device 104 may be multiple such intermediary devices arranged in a cluster or other configuration, possibly with the inclusion of one or more load balancers, and configured to provide the services described herein. A client device 105 ("client") is a computing device capable of making a request (e.g., for an object, service, etc.) over the network 106 and receiving a response for the request. For instance, the client 105 may be a personal computer (PC), a hand-held device or personal digital assistant (PDA) type device, a smart-phone, a tablet computer, etc. In one embodiment, the client may run a web browser application and may make requests for objects over network 106 by utilizing the web browser. Responses to the requests may be returned from servers 108, which are communicatively coupled to the intermediary device via network 107.

The intermediary device 104 is a computing device, or a collection of computing devices, capable of receiving and responding to the request made by the client 105. In some cases, the intermediary device 104 may include a cache storing objects that may be requested by the client 102. Importantly for the purposes of the present invention, the intermediary device 104 is configured to support multiple tenants, such as the multiple LANs 102. Each LAN 102 may be administered by a different group and/or associated with different corporate or other interests. The LANs may be different segments of a common enterprise network, or may be completely independent of one another, or a combination of segments of a common network and independent networks. What matters for purposes of the present invention is that the intermediary device 104 is able to distinguish between requests originating at different ones of the clients, at least at a level sufficient to identify that the requests are subject to different policies.

The networks 106 and 107 may be distinctly separate networks or the same network and may be any kind of networks known in the art. For instance, networks 106 and 107 may be private networks, such as intranets, extranets, local area networks (LANs), or wireless networks. The networks 106 and 107 may also be public networks, such as the Internet. Additionally, networks 106 and 107 may be a combination of private and public networks. Furthermore, many computer devices may have multiple network cards and, thus, networks 106 and 107 may contain multiple upstream or downstream networks.

As indicated above, the environment 100 in which the intermediary device operates may further include a plurality of servers 108 that provide content to the intermediary device 104, for example when a requested object cannot be served from the intermediary device's object store. The intermediary device 104 has the ability to query (on behalf of some or all of the clients) any one of the plurality of servers 108 for the object. Servers 108 are computer devices that can receive the query and respond in kind with the requested object.

Figure 2:
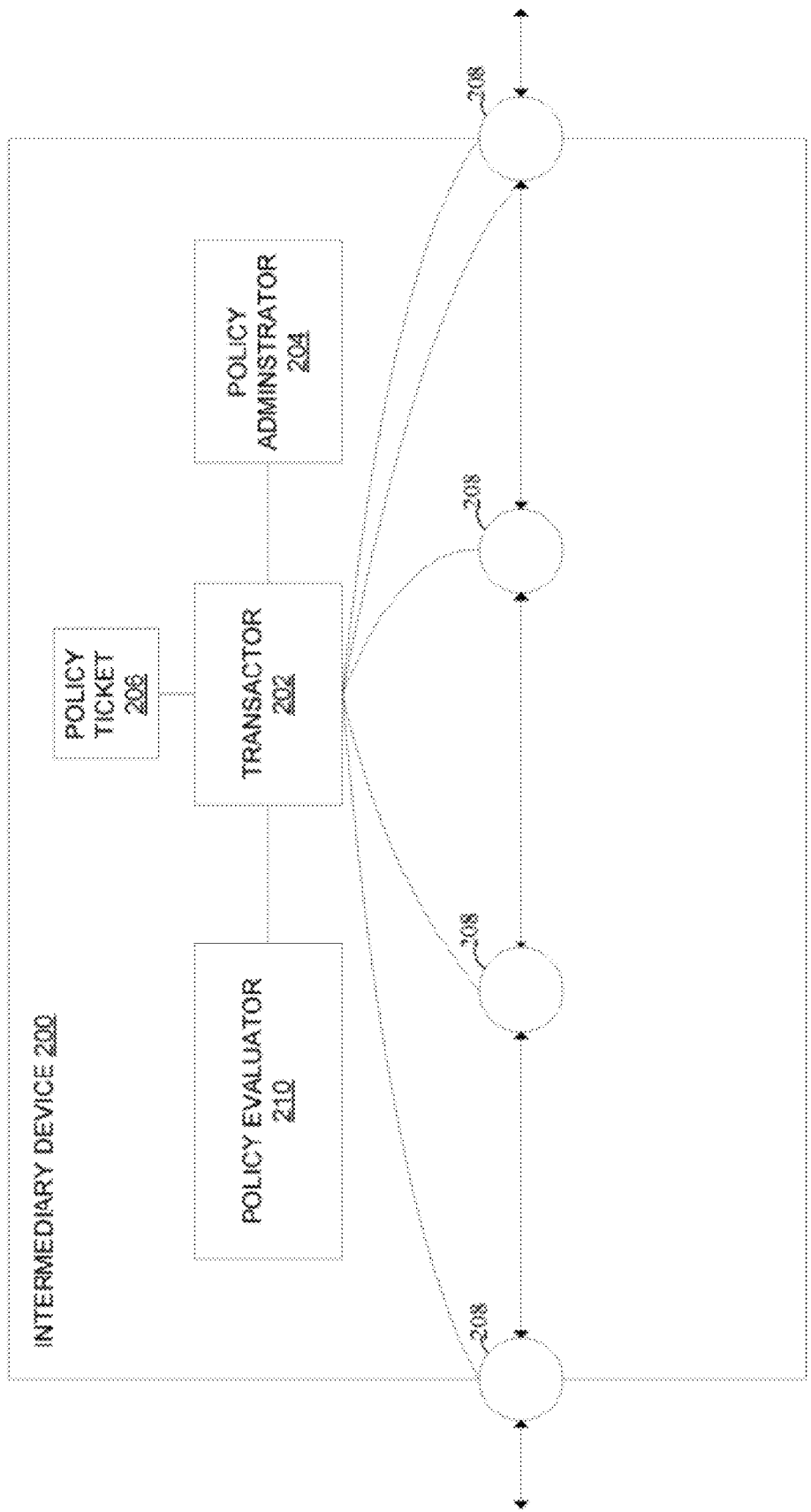
FIG. 2 is a block diagram of one embodiment of an intermediary device, according to the present invention.

FIG. 2 is a block diagram of one embodiment of an intermediary device configured according to the present invention. Intermediary device 200 includes a transactor 202, a policy administrator 204, a policy ticket 206, a plurality of checkpoints 208, and a policy evaluator 210.

The transactor 202 is configured to establish a connection at the beginning of a client/intermediary communication ("client communication"), facilitate the progress of the request and response throughout the client communication, and close the connection at the end of the client communication. A transactor 202 may be protocol specific to facilitate requests made for different protocols. Hence, in one embodiment, the transactor 202 is any one of a plurality of protocol agents well known in the art.

The policy administrator 204 is configured to maintain various policy versions and assign to the policy ticket 206 the correct (usually the most current) version of policy available at the time the client communication begins. The policy administrator includes a mechanism for selecting among policies of different "customers" of the intermediary device based on one or more criteria included in or aspect of a request. Here, the term "customer" is used to indicate one of the multiple tenants of the intermediary device, that is, one of the users (which may be an individual user, a network of users, multiple networks of users, an Internet service provider, or other entity) which shares the intermediary device for policy enforcement. The policy administrator may also include a mechanism for retaining previous, i.e., non-current, versions of policies that may be required by transactions not yet complete when a policy change is made.

The policy ticket 206 has stored thereon information, such as actions and properties, according to one version of policy, which may be enforced during the client communication. The policy ticket is transported throughout the client request's path through the intermediary device. The policy ticket acts as a consultant, or a reference, to the version of policy that was current when the client communication first began.

The path of the client communication is defined by the plurality of checkpoints 208, which are points in the communication where policy rules may need to be evaluated, or reevaluated, based on new information obtained or new events that have occurred ("new information"), during the client communication. At any, or all, checkpoints 208, the transactor 202 delivers the policy ticket 206 to the policy evaluator 210 so that the policy evaluator 210 may determine if the new information merits a reevaluation of policy, and, if so, then the policy evaluator 210 can reevaluate policy based on the new information and determine appropriate actions or properties that will need to be subsequently executed or referenced. In addition the policy evaluator 210 may be configured to perform policy re-evaluations. For example, in the case of long-standing transactions (those requiring a relatively long period of time to complete) the policy evaluator may be configured to periodically query the policy administrator or the transactor to determine if the policy used to evaluate the transaction remains current. If the policy is no longer current, the transaction may be evaluated against the new policy. This may result in the transaction continuing, and the response traffic continuing to be provided to the client, or being denied, and the response traffic ceased part way through its delivery to the client.

The policy evaluator 210 may also perform other operations to the policy ticket 206 in anticipation of evaluation at other, future checkpoints. Such other operations may include executing the appropriate actions if possible, or storing on the policy ticket the appropriate actions to be subsequently executed by the transactor 202. Yet other operations may include maintaining the evaluation state for the current checkpoint and marking the policy ticket for future evaluation points. Such operations are further described in more detail in conjunction with FIG. 7 below.

Figure 3:
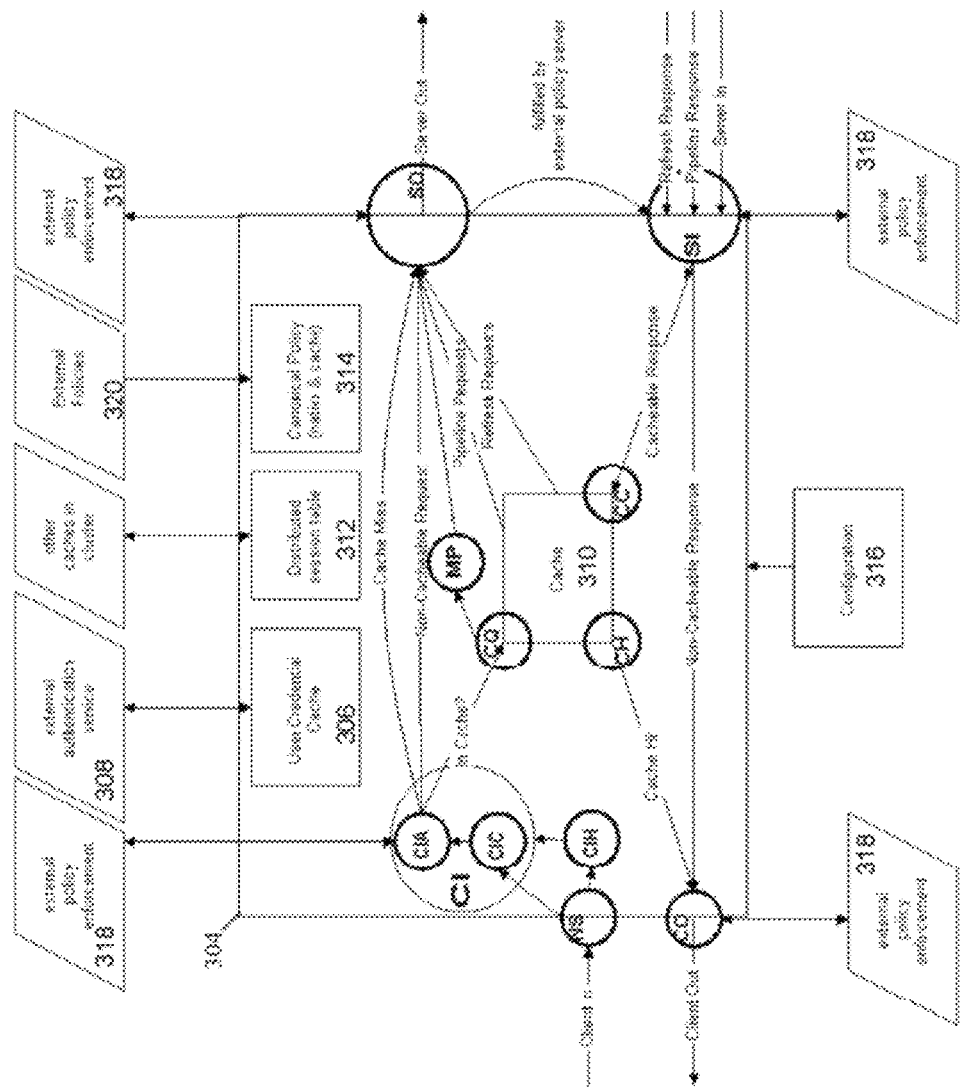
FIG. 3 is a diagram of an exemplary system architecture showing various checkpoints in relation to the processing of a client request within a network intermediary device.

FIG. 3 is a diagram of an exemplary system architecture showing various checkpoints in relation to the processing of a client request within a network intermediary device 304. The following table explains some checkpoints that the client request may encounter during its progression through the intermediary device 304 (said progression shown as arrows in FIG. 3):

| | | |
|---|---|---|
| New Session (NS) | | This checkpoint is encountered when a new session is established between the client and the intermediary device. At this checkpoint, available information may include certain header information, the service type being requested, the client source IP address, the destination IP address and the port. Tenant identity is often determined from the properties available at this checkpoint. |
| Client-In-Hostname (CIH) | | This checkpoint is used by protocols in which only the host name is available before a connection must be established to the server. The path portion of the URL becomes available after the connection to the server is established. This can be of importance for policy driven authentication. |
| Client In (CI) | | This checkpoint is encountered after the client request has been identified but before any attempts have been made to respond to (i.e., fulfill any portion of) the request. |
| | Client-In-Challenge (CIC) | Typically, the CIC occurs before the CIA. This checkpoint is used to determine the authentication realm and the required credentials (so that the client can be appropriately challenged and credentials acquired). If not previously established, tenant identity may be established here in order to drive selection of the correct policy to apply to the transaction. Tenant identity is typically required before an authentication challenge is issued, in order to know what realm (authentication domain or authority) to authenticate those credentials against. The realm would be different for different tenants. |
| | Client-In-Authorize (CIA) | At this point the client has been authenticated and associated authorization information, such as user attributes and group memberships, has been obtained. This checkpoint generally concerns using that information to evaluate access and entitlement policies for the particular user. |
| Cache Query (CQ) | | This checkpoint occurs when the object cache 310 is about to be queried to determine the availability of a requested object. |
| Media Play (MP) | | This checkpoint occurs when streaming media protocols are requested. It occurs after a cache query and after first contact has been made with a streaming media content server. Streaming media protocols evaluate this checkpoint for each request to alter the media stream. |
| Cache Hit (CH) | | This checkpoint occurs after a response has been obtained from the cache. CH is expected to evaluate the same policies for cached objects as would be evaluated at SI for objects that had to be fetched from an origin server. |
| Server Out (SO) | | This checkpoint occurs if the request is about to be sent to the server. |
| Server In (SI) | | This checkpoint occurs after the response has been received back from a server. |
| Cache Charge (CC) | | This checkpoint occurs after a response has been received from the server, and the content included in the response is cacheable. |
| Client Out (CO)/ | | The CO checkpoint occurs after a response to a request is ready and is about to be sent back to the client. |
| Client Out Terminated (COT) | | The COT checkpoint (not illustrated in the diagram) is evaluated when the transaction has been denied. (This can alter the error page sent back, terminate the connection, etc.) Only one of CO or COT is evaluated (CO handles allowed responses, COT handles denials and errors). |

In addition to the above, the checkpoint model may include additional checkpoints, such as one for access logging to control the way traffic is logged (for example, suppressing user identifying information for tenants operating in particular legislative jurisdictions).

Checkpoints are flexible and can be tailored to the requirements of specific protocols and authentication standards as necessary. For instance, as shown in FIG. 3, the Client-In (CI) checkpoint, which occurs generally when a client request has been fully received, is evaluated to determine authentication requirements. The Client-In-Challenge (CIC) is often the last opportunity to determine the tenant (and if the tenant identity is not discovered until this point it will be necessary to discard prior results and re-run policy checkpoint up to this point under the correct tenant policy). The CIC and the Client-in-Authorize (CIA) checkpoints are useful because the policy administrator must first determine the tenant or customer associated with the client request in order to obtain the correct policy applicable to the request. The tenant identification may be made using any one or more aspects of a request that are available for inspection or derivable through policy evaluation (i.e., some policies may be run on a request prior to tenant identification precisely to determine information needed to make the tenant identification; thereafter, the prior policies so run may be discarded in favor of the tenant-specific policies). For example, tenant identification may be made on the basis of one or more of Internet protocol address, header information included in a request, user agent information included with a request, a port number on which the request arrives, a property (real or derived) of the connection on which the request is received, etc.

Then, with the correct policy in place the policy evaluator must evaluate the policy to determine the authentication (e.g., authentication realm, authentication challenge type) required (if any). This may involve the policy evaluator determining the authentication authority and challenge type, and then passing the appropriate instructions or information to the transactor to actually perform the challenge and collect the credentials.

The user credentials may be obtained from a local user credential cache 306, accessible to the transactor and/or policy administrator. Because of the multi-tenant nature of the intermediary device, multiple, independent user credential caches may need to be kept and accesses to the appropriate cache for the subject transaction may be based on the tenant identification performed by the policy administrator. The user credentials may then be added to a user object associated with the transaction (see FIG. 10).

At this stage the user credentials have not been subject to any verification. Where such verification is required by the policy, the transaction is passed again to the CI checkpoint where the policy evaluator notes the need for authentication and that credentials are present but not verified, and the policy evaluator then validates the credentials with the appropriate authentication authority. This may involve communications between a third party authentication service and the intermediary device 304.

Once the user's credentials have been verified (if needed) processing proceeds to CIA. So, evaluation at CIC, determines the authentication requirement (i.e., a determination as to whether authentication is needed and, if so, what proof of identity is required and whom to trust to provide that information). At CIA, once the user is identified, the policy evaluator determines what the user is then allowed to do (i.e., authorization).

Intermediary device 304 may also include a distributed session table 312 for tracking sessions that are being handled across a cluster of intermediary devices, a canonical policy cache 314 for storing policies (note, as with the user credentials, each individual tenant of the intermediary device may have a separate policy cache or a single cache may store policies indexed by tenant), and a configuration module 316 for storing device configuration information (e.g., as specified by a device administrator). As shown in the illustration, at various points in the transaction, external policy enforcement may be effected 318, and/or external policies 320 obtained to inform transaction processing.

Several methods are described below that further explain the processing that occurs throughout the client communication according to several embodiments of the present invention.

Methodology:

FIG. 4 is a flow diagram of one embodiment of a method 400 for multi-tenant policy management in network device (such as the intermediary device discussed above) during a communication. Herein, a communication may be, for instance, a connection or a transaction. A connection is a lower network layer request to establish a connection between the client and the network device. A transaction, on the other hand, is an upper network layer request by the client, typically for an object, as well as the associated response to the client request, typically by obtaining and delivering the object to the client. For brevity's sake, unless where necessary to make a distinction, a connection and a transaction will be referred to generally as a communication.

Referring to FIG. 4, method 400 begins, at step 402, with establishing a communication session on a network to enable processing of a client request. In one embodiment of the invention, the session is established between a client and an intermediary device on a network to enable processing of a communication between the client and the intermediary device. However, the communication session may be between an intermediary device and a server, another intermediary device, etc. Further details are discussed in further detail in conjunction with FIG. 6 below.

Once a communication session has been established, the intermediary device determines, at step 404, the tenant identity associated with the session and obtains the correct policy which will govern the processing of the session. Usually, though not always, the session will be processed in accordance with the then-current policy for the tenant. However, in some instances it may be necessary to utilize a prior version of a policy, for example where a current session is related to an existing or prior session processed under a prior version of a policy. Tenant policy selection may be based on a property, real or derived, of the connection.

Next, method 400 continues, at step 406, with processing the communication while maintaining consistent policy rules enforcement according to the selected tenant-specific policy. Exemplary embodiments of processing the communication while maintaining consistent policy rules enforcement are described in more detail in conjunction with FIGS. 5, 6 and 7 below. Finally, method 400 concludes, at step 408, with terminating the communication session after the processing is completed.

FIG. 5 is an exemplary embodiment of a method 500 of processing a communication while maintaining consistent policy rules enforcement. Processing the communication may include utilizing a policy ticket that references a version of policy rules current at the beginning of the communication. The policy ticket may possess actions and properties, according to the current version of policy rules. Referring to FIG. 5, method 500 may begin, at step 502, with transporting the policy ticket between a plurality of checkpoints defining the flow of the communication. Method 500 may continue, at step 504, with determining, at any one of the plurality of checkpoints, if policy rules need to be evaluated. Then, at step 506, with evaluating the policy rules, according to information stored on the policy ticket or other pertinent information available to the intermediary device, to determine appropriate actions to be taken during the communication. Next, method 500 may further continue, at step 508, with optionally performing operations to the policy ticket in anticipation of evaluation at other checkpoints. These operations may include executing the appropriate actions, storing on the policy ticket the appropriate actions to be subsequently executed by a transactor, maintaining the evaluation state for the current checkpoint, and marking the policy ticket for future evaluation points, as described in detail in conjunction with FIG. 7 below. The process then ends.

Throughout the process depicted in method 500, the policy enforced is that which is current at the beginning of the communication. In some instances, the applicable tenant-specific policy may be changed. However, in order to ensure the illustrated transaction is evaluated against the policy that was current at the beginning thereof, the then-current policy is cached and made available to the policy evaluator as the various checkpoints are encountered. This ensures consistent decision making across the lifetime of the communication.

Figure 6:
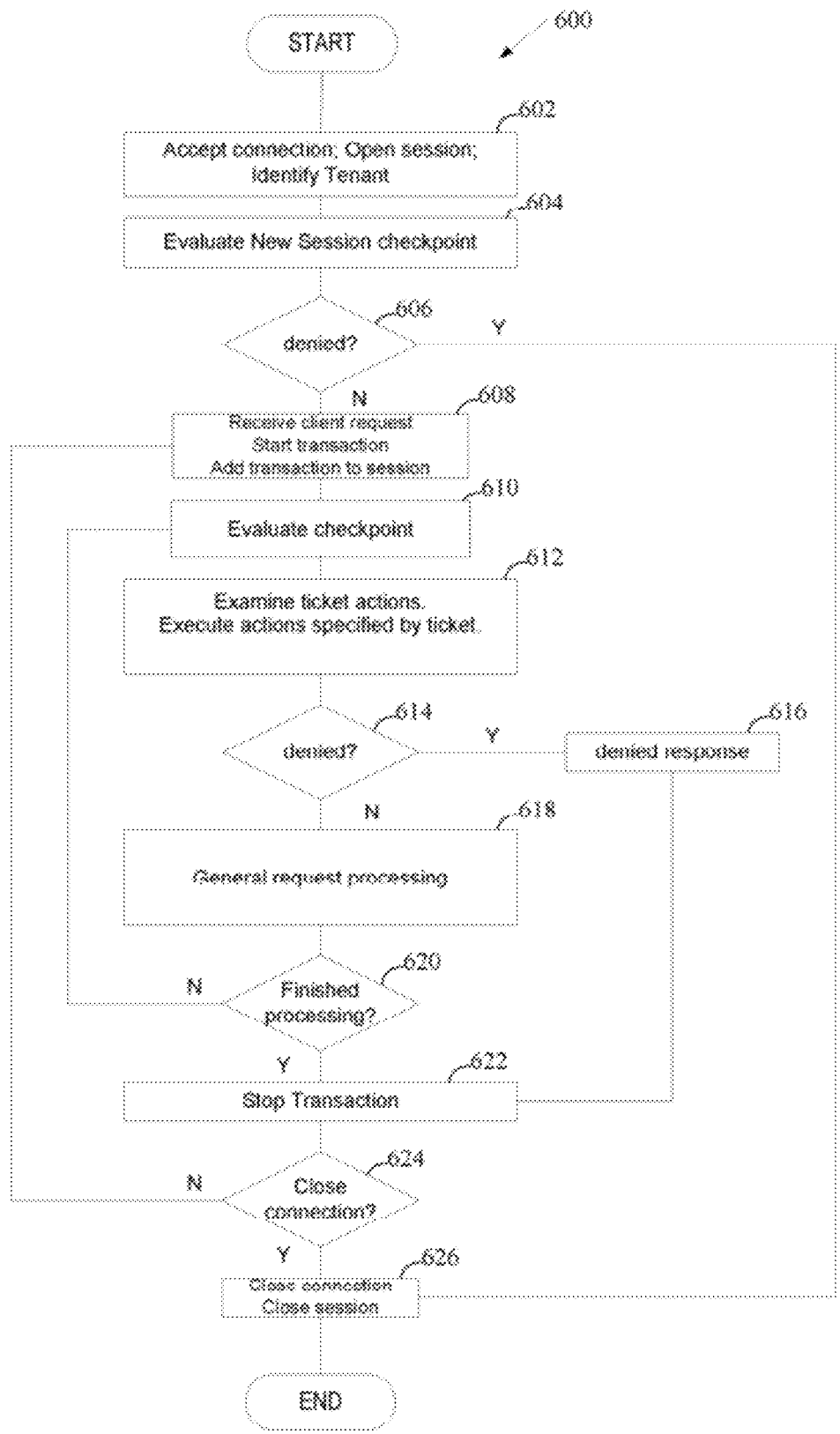
FIG. 6 is a flow diagram of one embodiment of a method for managing policies within a network intermediary device during a client/intermediary transaction.

FIG. 6 is a flow diagram of one embodiment of a method 600 for managing policies within a network intermediary device during a client/intermediary transaction. Referring to FIG. 6, method 600 begins, at step 602, with receiving a request from a client to open a network connection between the client and the intermediary device, and, in response, opening such a session. This may entail the transactor (in some cases a protocol-specific transactor, known as a protocol agent) opening a session object and communicating with a policy administrator. The policy administrator provides several utilities. First, the policy administrator provides a way to register the session for maintenance of resource quotas. Many of the future policy applications that may need to be supported are in the area of bandwidth management. These are often policies that limit the bandwidth available to a particular connection. Second, the policy administrator provides manual intervention, for instance, if an administrator wants to forcibly shut down particular traffic. Third, the policy administrator allows for identifying the tenant associated with the session, obtaining the applicable policy to be applied to the session and, in some instance, notification of policy changes affecting the session. A first policy ticket that references the applicable policy is then associated with the session for the duration of the connection.

Next, as shown in step 604, a first checkpoint is encountered. In one embodiment, this checkpoint may be referred to as a "New Session" checkpoint. At this point, the protocol agent delivers the first policy ticket to the policy evaluator and the policy evaluator evaluates the checkpoint (i.e., evaluates the connection according to the policy rules appliance to the checkpoint). An exemplary embodiment of evaluating a checkpoint is described in conjunction with FIG. 7 below. New Session, being the first checkpoint encountered for the first time during the connection, means processing step 604 would necessarily include processing in steps 702, 706, 708, and 710, thereby initializing the policy ticket.

Next, referring again to FIG. 6, method 600 continues, at decision block 606, with determining if the connection should be granted or denied. If the connection is denied, then the connection and session are closed, as shown at processing block 626. A grant or denial is done by the protocol agent, which determines such by checking the policy ticket for denial actions that may have been written onto the policy ticket according to policy rules as determined at processing step 604.

If the connection is granted, then method 600 continues, at processing step 608, with receiving the client request and starting a transaction. The protocol agent adds the transaction to the session. At this point, a second tenant-specific policy ticket is issued. By using a separate ticket, policy can be maintained for two distinct objects. More specifically, the policy ticket associated with the session may contain policy decisions applying to the single client connection. On the other hand, the policy ticket associated with the transaction may contain policy decisions applying to a specific request, carried over the connection. In other instances, step 608 is not included and only a single policy ticket is used for the duration of a connection.

Next, at processing step 610, the transaction encounters a checkpoint, and the protocol agent delivers the transaction and the associated policy ticket to the evaluator for checkpoint evaluation. Again, an exemplary embodiment of evaluating a checkpoint is described in conjunction with FIG. 7 below.

After checkpoint evaluation, as shown in processing step 612, the protocol agent examines and executes policy ticket actions that may have been written at processing block 610. Depending on what actions may have been written to the policy ticket, the transaction may experience a variety of processing, which may lead the transaction to certain other checkpoints within the intermediary device, or may even cause denial. Thus, in one embodiment, method 600 may continue, at processing block 614, with determining if the transaction should be denied continuance. If so, then the protocol agent may issue a denial response to the client, as shown at processing block 616, then stop the transaction, as shown at processing block 622.

However, if the transaction is not denied, then method 600 may continue, at processing block 618, with processing the client request. Ticket properties may be consulted during the processing of the request. For instance, the protocol agent may look at decisions rendered at one of the previously evaluated checkpoints, such as a setting for the maximum allowed download size, or whether or not the object should be virus scanned (this decision is often taken at CI based on the location or type of object being requested, but the action must be taken after the object has been retrieved from the server.

Once finished, as shown at decision block 620, the protocol agent determines whether the processing is complete. If not, then the transaction may need to continue to another checkpoint for further evaluation and processing, thus returning to processing block 610. If, however, processing is complete for the transaction, the method 600 continues, at processing block 622, with stopping the transaction. At this point, a reference count of the policy version may be performed. Within the intermediary device, a certain number of transactions may be using a certain version of policy at any given time. In other words, one version of policy may be referenced by more than one ticket. By performing a reference count, the protocol agent makes sure that the version of policy is not eliminated if other transactions are still utilizing it. If no transactions are utilizing the version of policy, then the reference count will be zero. When the reference count for a specific version of policy reaches zero and a predetermined period of time since the policy was replaced has elapsed (this is needed so that policies can correctly be decoded from authorization information obtained for authentication against previous instances of the policy), it will be deleted if a more recent version of policy has been installed.

Next, method 600 continues, at decision block 624, with determining if the connection should be closed. For instance, in a hypertext transfer protocol (HTTP) model, certain web browsers follow an early version of HTTP (pre version 1.1) that allows only one transaction per connection. However, later versions of HTTP allow for multiple transactions per connection. On the other hand, in an FTP protocol, the connection would not need to be closed for multiple transactions. Once all transactions are complete, then method 600 terminates, at processing block 626, with closing the connection and closing the session.

Figure 7:
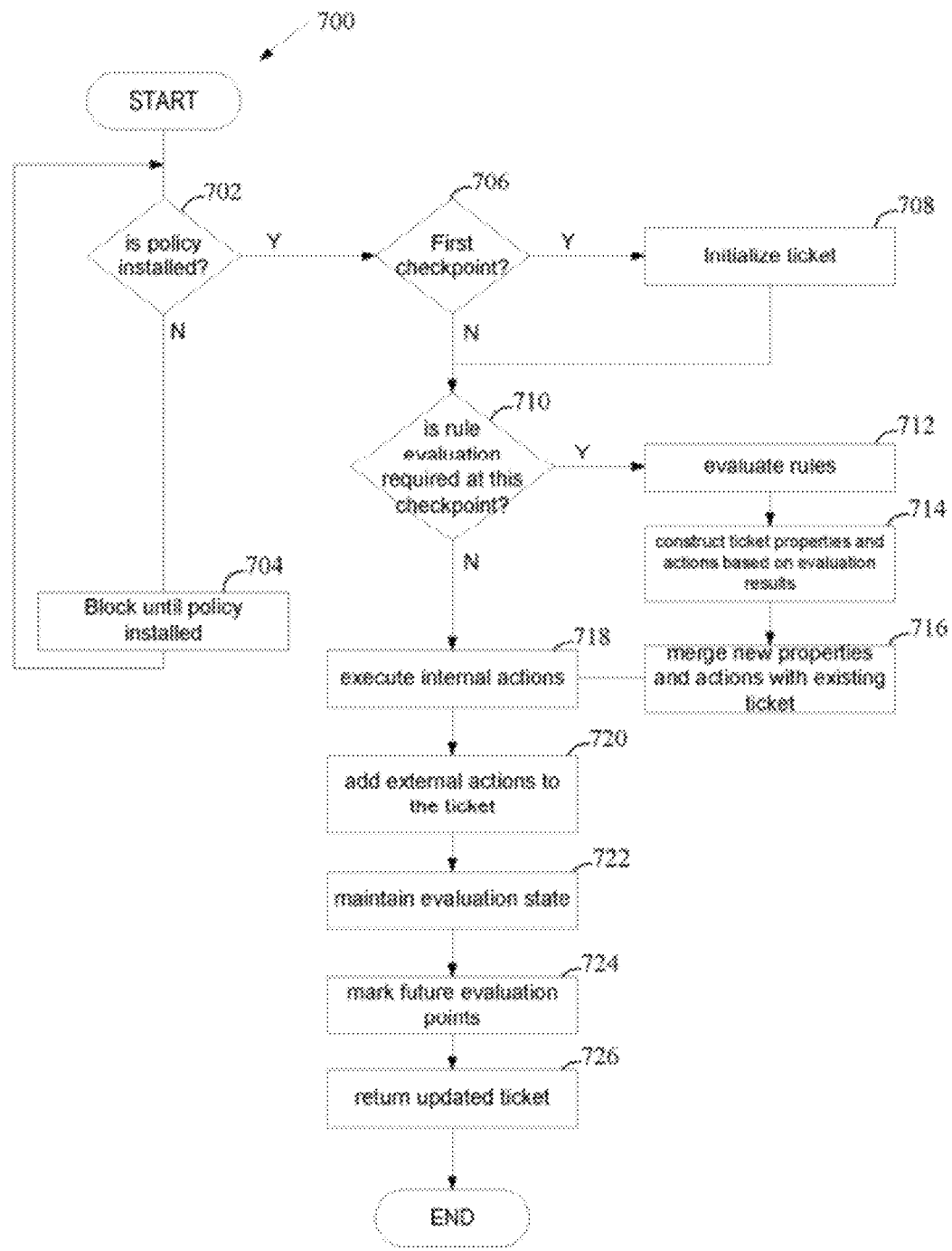
FIG. 7 is a flow diagram of one embodiment of a method for processing a communication between a client and an intermediary while maintaining consistent policy enforcement during the communication.

FIG. 7 is a flow diagram of one embodiment of a method 700 for processing a communication between a client and an intermediary device while maintaining consistent policy enforcement during the communication. Method 700 begins, at decision block 702, with the policy evaluator determining if a tenant-specific policy has been installed into the intermediary device for the particular communication of interest. With a single-tenant device it was possible for traffic to flow under an "unrestricted ticket" which was not attached to any policy. However, in a multi-tenant device this is not permitted. Hence, if no policy has yet been installed for the tenant associated with the communication, the policy evaluator blocks the communication, as shown in processing block 704, until a policy has been installed.

If, however, policy has been installed for the communication, then method 700 continues, at decision block 706, with the policy evaluator determining if the current checkpoint is the first checkpoint encountered for the communication, for the first time. If so, then the ticket is initialized, as shown at processing block 708. Initializing the ticket means the policy evaluator consults the policy administrator to determine the most current version of the tenant-specific policy stored on the intermediary device, and then stores the default values of current policy onto the policy ticket. Thus, the policy ticket has a first set of policy rules that can be referred to throughout the communication.

Next, method 700 continues with the policy evaluator determining if policy rules need to be evaluated at the checkpoint, as shown in decision block 710. For instance, policy may not need to be evaluated if no new information has been received between checkpoints to apply the policy rules to. Policy rules are condition statements, generally in the form of "if X, then Y". New information received during the client communication relates to the "if X" part of the rules. If no "if X"s occur, then no "then Y"s need to be determined. Furthermore, depending on the client request, or the point in the communication flow, certain checkpoints may not need to evaluate rules. For example certain rules may not need to be evaluated at certain checkpoints, depending on the client request. In another example, rules may have previously been evaluated for that checkpoint and will not need further evaluation if the communication reaches that checkpoint again. Essentially, by determining if policy rules need to be evaluated, the policy evaluator can act as a time and resource saver.

If rules need evaluation, then the policy evaluator evaluates the rules, as shown in processing block 712, then constructs properties and actions to be placed on the ticket based on the evaluation rules, as shown in processing block 714. In other words, the policy evaluates the "if Xs" and constructs the "then Ys".

Next, the policy evaluator merges the newly created properties and actions with existing properties and actions already on the policy ticket, as shown in processing block 716. The policy ticket may have properties and actions on the ticket that were previously created and written onto the ticket at previous checkpoints. When the rules are newly evaluated in the present checkpoint, however, some of the previous properties and actions may conflict with the new properties and actions, and therefore, may need to be replaced. Some previously created properties and actions, however, may not need to be replaced at all since they may not conflict with new properties and actions, but should be left on the ticket since they may be applicable at future checkpoints.

Next, the policy evaluator may execute actions internal to the intermediary device, as shown in processing block 718. Executing of internal actions implies actions that are not necessarily protocol specific, and therefore may be executed by the policy evaluator as opposed to a protocol specific transactor (i.e., protocol agent).

The policy evaluator may also add actions external to the intermediary device onto the policy ticket, as shown in processing block 720, which will later be enacted by a protocol specific transactor once the policy evaluator is finished processing, and delivers the policy ticket to the transactor.

Next, the policy evaluator will maintain the evaluation state for the checkpoint, as shown in processing block 722. Maintaining the evaluation state for the checkpoint includes recording what checkpoint the communication has just encountered, trimming the rule set, or analyzing partial evaluation results. Trimming the rule set includes storing information about the rule set applicable to the transaction. Analyzing partial evaluation results includes determining if some condition in the rules has already been evaluated and saving the results as a performance optimization.

Next, method 700 continues, at processing block 724, with marking the policy ticket for future evaluation points. The policy evaluator marks certain policy rules for future evaluation at subsequent checkpoints. Hence, the process of making the decision at decision block 710 is based on data recorded in processing step 724, if the checkpoint is not the first checkpoint encountered for the first time. For the first checkpoint encountered for the first time, the initializing of the ticket with default values, as performed in processing block 708, replaces the necessary processing performed in block 724 for checkpoints other than the first entered for the first time. For this reason, the initializing of the ticket, block 708, is only done once per communication, but marking of future evaluation points, block 724, may be performed as many times for as many times as checkpoints encountered during communication after the first checkpoint.

Finally, once the policy evaluator is finished processing, method 700 continues, at processing block 726, with delivering the policy ticket to the transactor so that the client request may continue for the communication. Method 700, therefore, assures that the communication will efficiently flow according to a single version of policy, stored on the policy ticket, from checkpoint to checkpoint, until the communication is complete.

Figure 8:
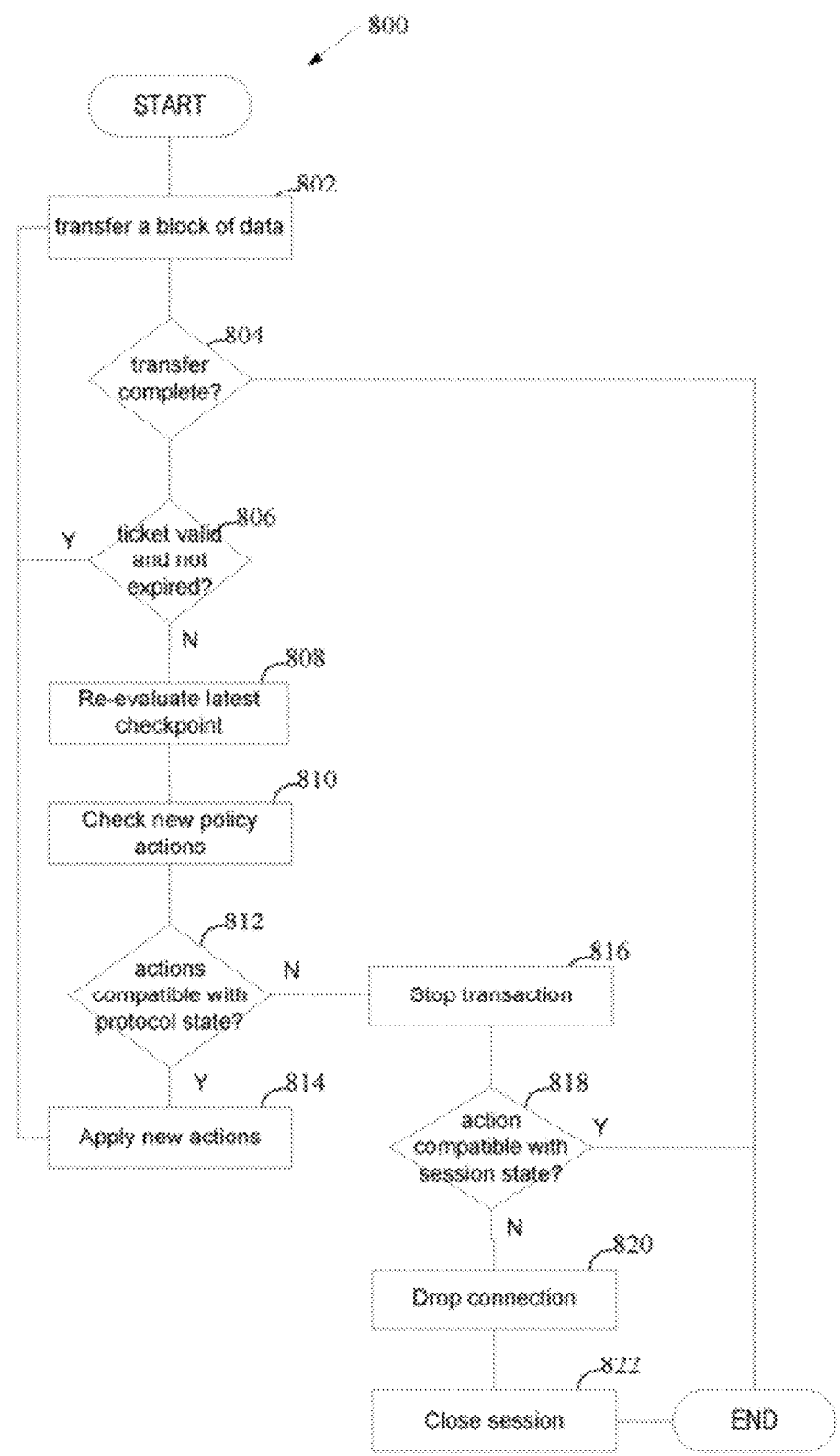
FIG. 8 is an exemplary method for determining the validity of a policy ticket during a data transfer between the intermediary and the client.

FIG. 8 is an exemplary method 800 for determining the validity of a policy ticket during a data transfer between the intermediary and the client. When data is being transferred from the intermediary device to the client, it may be advantageous to expire, or invalidate a policy ticket. Expiry and invalidation may be necessary for extended data transfers between the client and the intermediary that may need reevaluation of policy rules. In one embodiment, the data transfer may occur within a data pump, and may already have encountered the final checkpoint (e.g., Client-Out) for a transaction.

Referring to FIG. 8, method 800 begins, at processing block 802, with transferring a block of data between the intermediary device and the client. Then, the transactor (e.g., protocol agent) determines if the transfer is complete, as shown in decision block 804. The transfer of data may be large, or last for a long time, as in the case of streaming media; therefore, the transactor may be checking intermittently to see if the data transfer has finished yet.

If the data transfer is not complete, the transactor may want to also determine if the version of policy on the latest policy ticket is valid or expired, as shown in decision block 806. For instance, if there has been a new version of policy loaded onto the intermediary device, then the policy ticket may be invalidated. Furthermore, if the data transfer is happening over a long period of time, the policy ticket may simply need to be retired, or expired. For instance, policy rules such as "video streams are only available during lunch hour" may require that authorization granted through the policy ticket be set to expire. Therefore, if the ticket is neither invalid nor expired, method 800 continues with transferring the next block of data, as shown in processing block 802. However, if ticket is either invalid or expired, then method 800 continues, at processing block 808, with reevaluating the latest checkpoint encountered by the transaction. In most cases, the last checkpoint will either be the Client-Out checkpoint, or the Media-Play checkpoint. An exemplary method of reevaluating the latest checkpoint is described in more detail in conjunction with FIG. 9 below.

Once the transaction has been re-evaluated, the ticket is validated, meaning that policy decisions in the policy ticket reflect the current rules and should be enforced. However, it will contain new actions which may be the same as or completely different from the properties and actions on the invalidated ticket. For example, the validated ticket may now deny the transaction or require that the user associated with the transaction be authenticated, when this was not previously required. These differences could be because of new rules (in the invalidated ticket case), or because a time boundary was crossed (in the ticket expiry case). Hence, those new actions will need to be checked, as shown at processing block 810.

Once the new actions are checked, method 800 continues, at processing block 812, with determining if the new actions are compatible with protocol state. The checkpoint framework is used in conjunction with a set of "conditions", "properties" and "actions" whose timing requirements are defined in terms of the checkpoint framework. For instance, "conditions" have an earliest checkpoint at which they can be evaluated, "properties" have a last checkpoint at which they can be set, while "actions" have an earliest and latest checkpoint at which they can be performed (if the earliest and latest checkpoints for an action are the same, then the action must be performed at that checkpoint). Therefore, determining if the new actions are compatible with protocol state means checking these timings to ensure that the presence on the ticket of required actions that cannot be performed results in denial. It is up to the policy compiler to ensure that, within the single version of policy, impossible policies are syntactically invalid. The policy administrator refuses to load such impossible policies.

For example, a transaction under one version of policy version may not have required authentication. If policy changes, however, to now require authentication for the transaction while the transaction is in progress, and the ticket is re-evaluated while delivering data to the client after the Client-Out checkpoint, an authenticate action will be attached to the ticket. However, because of the definition of the protocol being used, the authentication challenge must be presented to the client prior to the Client-In-Authorize checkpoint—unless the client pro-actively offered credentials—and there would be no way to get them, thus no way to authenticate the user. Therefore, in such a scenario, the timing of the actions is off and policy would dictate that the transaction be stopped. If the credentials were by chance present, however, then the user could be authenticated, and, if successful, the method could continue.

If the new policy actions are compatible with the protocol state, then the new actions are applied, and the next block of data may be transferred, as shown in processing blocks 814, and 802. If, however, the policy actions are not compatible with the protocol state, the transaction is stopped, at processing block 816, and the actions must be determined as compatible with the session state. For example, sessions can have such things as security contexts associated with them, such as Secure Sockets Layers. The transaction policy ticket may thus indicate session security requirements contrary to the security contexts. If the session cannot meet the requirements of the transactions arriving on it, the connection and session may need to be closed, as shown in processing blocks 820 and 822, respectively, and the client would need to establish a new connection, which would establish a new policy session. If the new policy is compatible with session state, however, then there can be new requests accepted over the connection, and processing continues.

Figure 9:
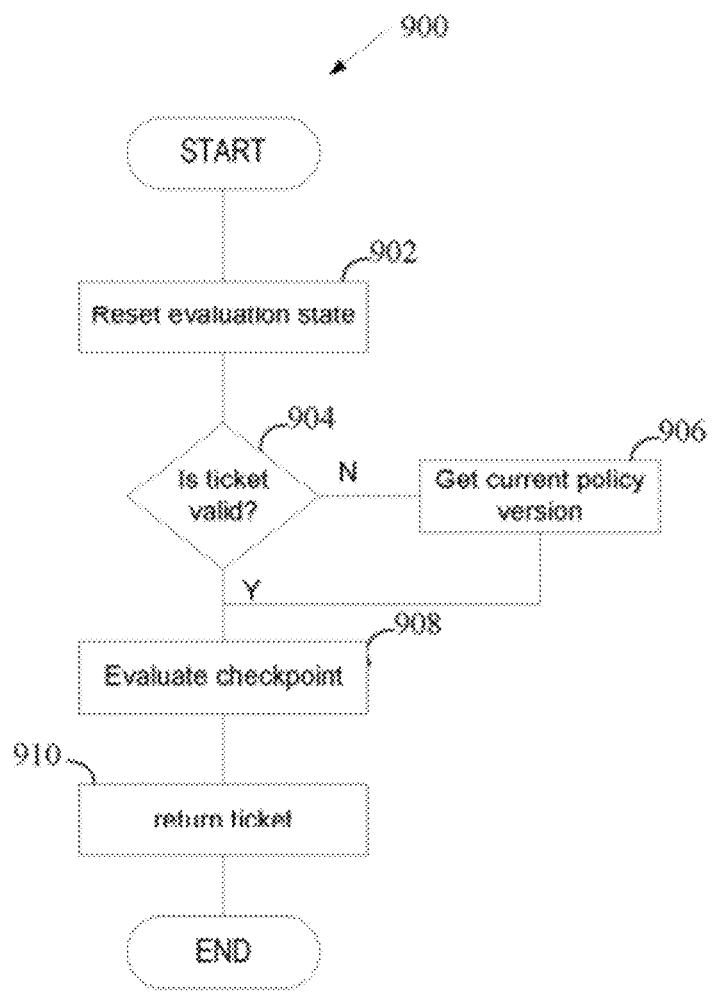
FIG. 9 is an exemplary method of reevaluating a checkpoint during a data transfer in a communication.

FIG. 9 is an exemplary method 900 of reevaluating a checkpoint during a data transfer in a communication. Method 900 begins, at processing block 902, with resetting the evaluation state. This may include resetting the state of processing as described in FIG. 7, processing blocks 722 & 724, including clearing partial condition evaluation results, rule set trimmings, the latest checkpoint successfully evaluated, and future evaluation points markings. Next, method 900 continues, at decision block 904, with determining if the policy ticket is valid, as opposed to expired. If found invalid, then the latest version of policy is retrieved from the policy administrator and the ticket is updated with a current version of policy, as shown in processing block 906. Then, the checkpoint may be evaluated with the new version of policy, as shown in processing block 908. Checkpoint evaluation may follow the same methodology as described in conjunction with FIG. 7 above. Finally, method 900 concludes with returning the new policy ticket to the transactor so that new policy actions can be checked.

Figure 10:
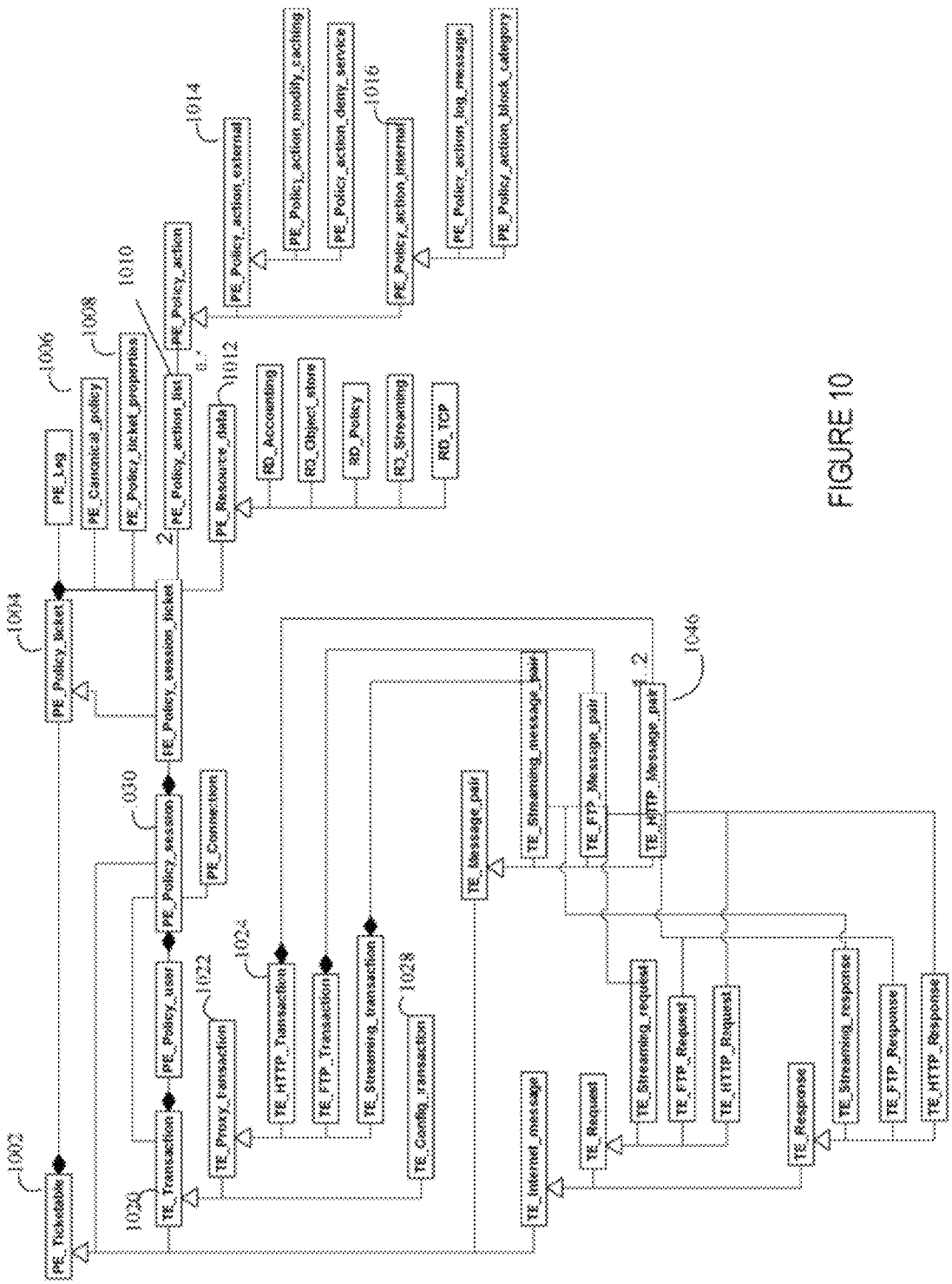
FIG. 10 is a high-level block diagram of an object model of one embodiment of the invention.

Object Model:

FIG. 10 is a high-level block diagram of an object model 1000 of one embodiment of the invention. Model 1000 is not intended to represent a complete list of transaction types, or actions, but merely indicates exemplary transaction types, and actions, to illustrate an object structure according to one embodiment of the invention. Model 1000 demonstrates interaction between components of a policy ticket 1004, such as a version of canonical policy 1006, properties 1008, action lists 1010, and resource data 1012. Model 1000 further demonstrates how a variety of objects are ticketable 1002, including sessions 1030 and transactions 1020. Ticketable objects are objects that have access to policy decisions that have been made and which can therefore take policy directed actions. Furthermore, model 1000 demonstrates that protocol specific transactions 1022 are only one type of transaction. Transactions could also be administrative transactions 1028, which are transactions that apply policy for managing the intermediary device.

In addition, model 1000 also demonstrates how a protocol specific transaction, such as an HTTP transaction 1024 has two distinct message pairs 1046—1) a client-side message pair and 2) a server-side message pair—which are related throughout a protocol specific transaction. For an HTTP transaction, the transaction may need to be split up into two separate connections—the first is a connection between the client and the intermediary device, the second from the intermediary device to a server. The server holds content (i.e., objects) that are not available in the intermediary device. Thus, within the client-side and server-side message pairs, are four messages: (1) the client request to the intermediary device, (2) the intermediary device's request to the server, (3) the server's response to the intermediary device, and (4) the intermediary device's response to the client. An advantage of model 1000, therefore, is that since one policy ticket 1004 applies to a single transaction that includes the two message pairs (the four messages), a single version of policy applies to both server-side and client-side messages.

In addition, model 1000 demonstrates that associated with the policy ticket 1004, there are two lists of policy actions 1010, a list of external actions 1014, and a list of internal actions 1016.

Figure 11:
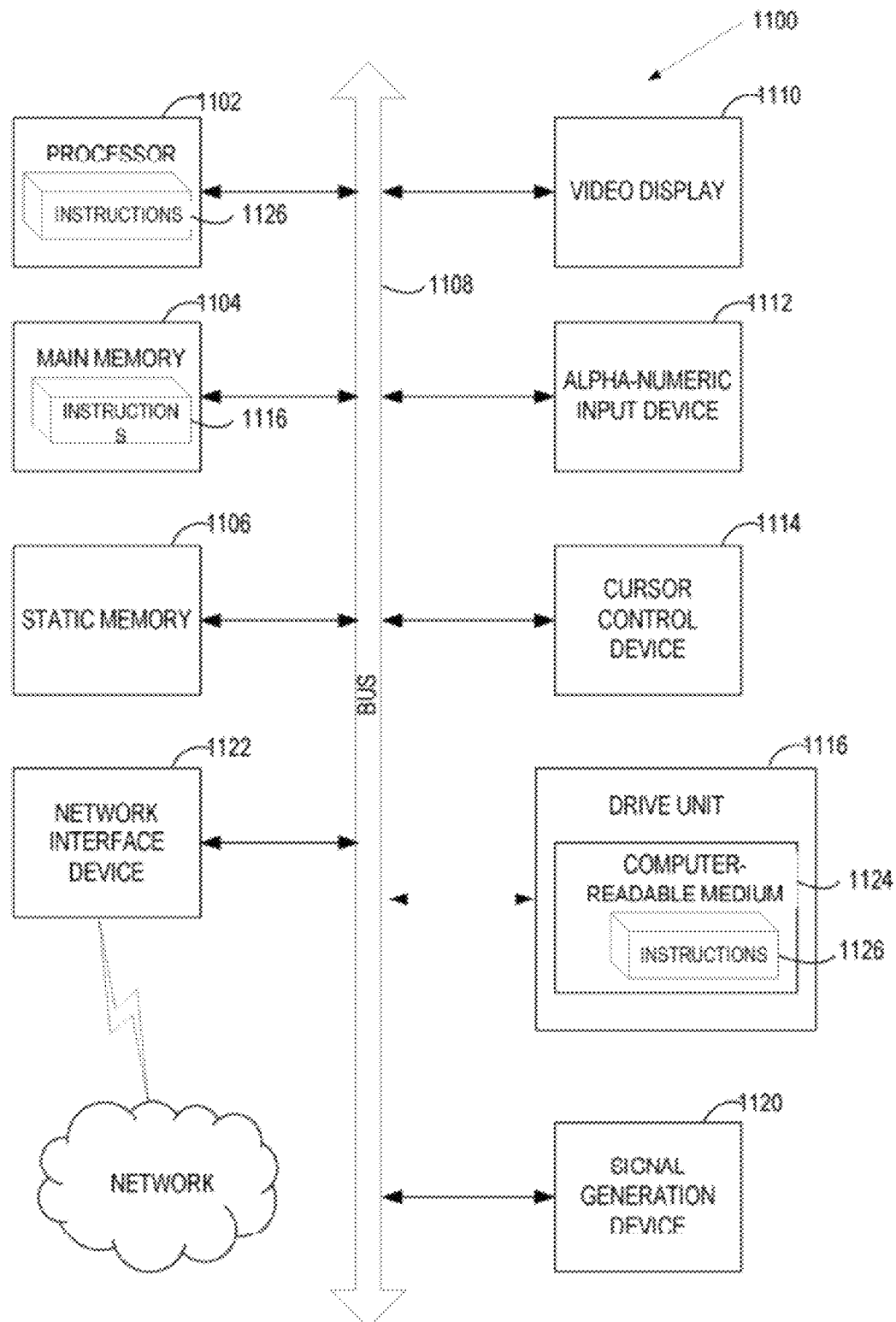
FIG. 11 shows a diagrammatic representation of machine in the exemplary form of a computer system within which a set of instructions, for causing the machine to perform any one of the methodologies discussed above, may be executed.

Computer Architecture:

FIG. 11 shows a diagrammatic representation of machine in the exemplary form of a computer system 1100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or other display). The computer system 1100 also may include an alphanumeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "computer-readable medium" shall be taken to include any non-transitory medium that is capable of storing or encoding a sequence of instructions for execution by the computer and that cause the computer to perform any one of the methodologies of the present invention. The term "computer-readable medium" shall accordingly be taken to included, but not be limited to, solid-state memories, and optical and magnetic disks.

Thus, a method and apparatus for policy management has been described. Although numerous specific details were set forth, one of ordinary skill in the art will appreciate that some of these specific details are not necessary to practice the present invention. Further, while certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

Some portions of the detailed description were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The apparatus for performing the operations described herein may be specially constructed for the required purposes, or it may comprise a general-purpose computer selectively activated or reconfigured by a computer program stored by the computer. Such a computer program may be stored in a non-transitory computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of tangible (i.e., non-transitory) media suitable for storing electronic instructions, and each coupled to a computer system bus.

The scope of the present invention should only be measured by the claims, which follow.

What is claimed is:

1. A method, comprising:

in response to receipt of a request from a client to obtain an object stored by a server, said request being received at an intermediary device logically disposed between the client and the server, a transactor of the intermediary device opening a session for the request and referring the request to a policy administrator of the intermediary device for determining which of a plurality of tenants serviced by the intermediary device is a tenant associated with the client making the request;

upon determining the tenant associated with the client making the request, the policy administrator selecting a then-current tenant-specific policy by which the request is to be processed and providing the selected tenant-specific policy to the transactor;

instantiating the tenant-specific policy provided by the policy administrator as a policy ticket and thereafter the transactor and a policy evaluator cooperating to evaluate and process the request and any response thereto at one or more communication flow checkpoints according to rules reflected in the policy ticket.

2. The method of claim 1, wherein as each communication flow checkpoint is encountered, the processing of the request includes determining, by consulting the policy ticket, whether the request should be denied.

3. The method of claim 2, wherein if the request is denied, then the transactor closing the session; otherwise continuing to evaluate the request at each successive checkpoint, until processing of the request is complete.

4. The method of claim 1, further comprising transferring data satisfying the request to the client after encountering a final checkpoint.

5. An apparatus, comprising:
a processor;
a storage device connected to the processor; and
a set of instructions on the storage device that are executable by the processor, including:
a policy administrator software subroutine configured to identify a particular tenant associated with a communication received at the apparatus, said particular tenant being one of a plurality of tenants serviced by the apparatus, and to select, based on said identification, a version of tenant-specific policy current at the beginning of the communication;
a transactor software subroutine configured to receive from the policy administrator the selected version of the tenant-specific policy and facilitate progress of the communication through a plurality of communication flow checkpoints; and
a policy evaluator software subroutine configured to process the communication at each of the checkpoints by cooperating with the transactor to receive the selected version of the tenant-specific policy and evaluate the communication according thereto at each of the checkpoints.

6. The apparatus of claim 5, further comprising a software subroutine configured to retain non-current versions of tenant-specific policy used by incomplete transactions being processed by the apparatus.

7. The apparatus of claim 5, further comprising a software subroutine configured to trigger re-evaluation of in-progress transactions when an associated tenant-specific policy is revised.

8. A method for managing policies within a network intermediary device, comprising:

opening a network connection between a client and the network intermediary device when said connection is permitted by a tenant-specific policy comprising a first rule set relating to network connections, said tenant specific policy having been selected from among a plurality of policies each associated with respective ones of a plurality of tenants serviced by the network intermediary device;

processing a transaction over the network connection according to at least one additional tenant-specific policy, said additional tenant-specific policy comprising a second rule set for processing data received at the intermediary device for the transaction, said second rule set being different from the first rule set, the transaction comprising a request received from the client over the network connection;

upon completion of the transaction, closing the network connection when an evaluation determines that the connection should be closed, and not closing the connection when an evaluation determines that the connection should not be closed; and in the event the connection is not closed, reusing, subject to the at least one additional tenant-specific policy, the connection for further transactions with the client.

9. The method of claim 8, further comprising utilizing a policy ticket describing actions and properties to be taken during a communication, said actions and properties corresponding to a version of tenant-specific policy rules current at a beginning of the communication and updated thereafter, as the policy ticket is evaluated as the communication reaches a plurality of checkpoints defining a flow of the communication and according to determinations, at any of the plurality of checkpoints, of actions to be taken during the communication.

10. The method of claim 9, wherein the communication is any one of a connection or a transaction.

11. The method of claim 9, wherein determinations of actions to be taken during the communications comprise evaluations of the tenant-specific policy rules according to information stored on the policy ticket.

* * * * *